(12) United States Patent
He et al.

(10) Patent No.: US 9,779,778 B2
(45) Date of Patent: Oct. 3, 2017

(54) METHOD AND APPARATUS FOR ENABLING AN APPLICATION TO COOPERATE WITH RUNNING OF A PROGRAM

(75) Inventors: Dahua He, Shanghai (CN); Mo Li, Shanghai (CN); Jin Wang, Shanghai (CN); Yang Peng, Shanghai (CN); Bei Wang, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2136 days.

(21) Appl. No.: 11/722,184

(22) PCT Filed: Dec. 15, 2005

(86) PCT No.: PCT/IB2005/054252
§ 371 (c)(1),
(2), (4) Date: Jan. 7, 2010

(87) PCT Pub. No.: WO2006/070298
PCT Pub. Date: Jul. 6, 2006

(65) Prior Publication Data
US 2010/0119209 A1    May 13, 2010

(30) Foreign Application Priority Data
Dec. 27, 2004 (CN) .......................... 2004 1 0104499

(51) Int. Cl.
*G11B 27/32* (2006.01)
*G11B 27/10* (2006.01)
*H04N 21/8545* (2011.01)

(52) U.S. Cl.
CPC .......... *G11B 27/329* (2013.01); *G11B 27/105* (2013.01); *G11B 2220/213* (2013.01); *G11B 2220/2541* (2013.01); *H04N 21/8545* (2013.01)

(58) Field of Classification Search
CPC ...... G11B 2220/213; G11B 2220/2541; G11B 27/105; G11B 27/329
(Continued)

(56) References Cited

U.S. PATENT DOCUMENTS 6,631,387 B2    10/2003  Kim et al.
8,060,740 B2 *  11/2011  Yoon et al. .................. 713/155
(Continued)

FOREIGN PATENT DOCUMENTS

EP       1553769 A1    7/2005
EP       1608165 A1    12/2005
(Continued)

*Primary Examiner* — Gelek W Topgyal

(57) ABSTRACT

The present invention provides a method and apparatus for enabling an application to cooperate with the running of a program. According to the invention, the playing control information of a program and the linking information of an application corresponding to the program are edited into a program playing control file. Through executing said playing control file, guided by the linking information and based on the running control information of the application, the application can download, run or stop to run cooperating with the playing of the optical disc program. The Solution of combining an application and a program into a playing control file will effectively cause the downloading and running of the application to cooperate with the playing of the program so as to ensure normal realization of corresponding functions.

18 Claims, 2 Drawing Sheets

(58) Field of Classification Search
USPC .................. 386/238–240, 248, 332, 334
See application file for complete search history.

(56) References Cited

U.S. PATENT DOCUMENTS

| | | |
|---|---|---|
| 2001/0053280 A1 | 12/2001 | Yamauchi et al. |
| 2002/0064374 A1 | 5/2002 | Ando et al. |
| 2002/0112226 A1 | 8/2002 | Brodersen et al. |
| 2003/0161615 A1* | 8/2003 | Tsumagari ........... G11B 19/025 386/230 |
| 2003/0215224 A1* | 11/2003 | Yoo et al. ..................... 386/125 |
| 2003/0219227 A1 | 11/2003 | Otala et al. |
| 2004/0133661 A1* | 7/2004 | Yoon et al. .................... 709/219 |
| 2004/0141716 A1* | 7/2004 | Chung et al. .................. 386/125 |
| 2004/0179822 A1* | 9/2004 | Tsumagari ........... G11B 27/105 386/240 |
| 2004/0218900 A1* | 11/2004 | Yoon ................ G11B 20/00086 386/240 |
| 2005/0019014 A1* | 1/2005 | Yoo et al. ....................... 386/95 |
| 2005/0089314 A1* | 4/2005 | Chung et al. .................. 386/125 |
| 2005/0131858 A1* | 6/2005 | Seo ..................... G11B 27/034 |
| 2006/0077773 A1* | 4/2006 | Seo et al. .................... 369/30.09 |
| 2006/0098940 A1* | 5/2006 | Seo et al. ....................... 386/46 |
| 2010/0260489 A1 | 10/2010 | Okada et al. |

FOREIGN PATENT DOCUMENTS

| | | |
|---|---|---|
| EP | 1551027 A1 | 7/2006 |
| JP | 20001271660 A | 10/2001 |
| WO | WO2004001749 A1 | 12/2003 |
| WO | WO2004053871 A1 | 6/2004 |

* cited by examiner

METHOD AND APPARATUS FOR ENABLING AN APPLICATION TO COOPERATE WITH RUNNING OF A PROGRAM

FIELD OF THE INVENTION

The present invention relates to the field of optical storage, in particular to a method and apparatus for enabling an application to cooperate with the running of a program.

BACKGROUND OF THE INVENTION

With the development of optical storage technology, programs stored on optical discs could have been played without following the fixed order. It almost becomes one necessary function in an optical disc playing apparatus that a user is enabled to perform interactive operation, while the network linking function has gradually become an important part of the newly rising functions of various optical disc formats. For example, an Enhanced Digital Versatile Disc (DVD) optical disc format defines a good interactive operation function and network linking function.

All these functions are usually realized in a manner of menu navigation. An optical disc playing apparatus responds to some commanded triggering events (e.g. the pressing of buttons) according to the menu to realize corresponding functions. All the interactive operation functions and network linking functions are determined during editing the optical disc.

As an optical disc format of new generation, A Blue-ray Disc is, in addition to its well-known incomparably large storage, characterized by providing rich and flexible personalized interactive functions and network linking functions. A Java application, as a completely object-oriented application, is introduced into the Blue-ray Disc format and it can run on various platforms, so a Java application is quite suitable to act as a tool enabling more personalized interactive functions and network linking functions available to the user. It becomes an issue worthy of note how to enable a Java application to run with respect to an optical disc program according to determined time and effect.

Traditional methods of managing the correspondence between Java applications and programs being played are frequently adopted on a Multimedia Home Platform (MHP). In MHP, programs and Java applications are transmitted in real time to the user via code stream. The editors at the server terminal transmit an Application Information Table (AIT) and Java applications according to predetermined time to make the applications cooperate with the playing of the programs, so there is no need for association information between the programs and applications. An AIT contains the information describing a Java application, such as storage information, type information, information of resource required for running, running start information, running end information, etc. The user terminal unscrambles the received AIT and controls the running of corresponding Java application based on the relevant information therein, what is presented to the user is an integrated effect brought about by the programs being played and corresponding applications.

As far as a Blue-ray Disc is concerned, however, the programs and corresponding Java applications are stored on an optical disc or in network, and are read or downloaded upon request by an optical disc playing apparatus, which is different from the situation in MHP that the programs and Java applications are transmitted in real time by the server terminal and are received and used in real time by the user terminal. Therefore, unlike in MHP, a Java application in Blue-ray Disc format is impossible to run through the user terminal receiving AIT and unscrambling AIT in real time so as to realize corresponding functions. Furthermore, in a Blue-ray Disc format, an optical disc program may possibly need the support of several applications, whereas a Java application may serve the playing of a plurality of optical disc programs, so the issue of applications corresponding to the playing of optical disc programs becomes more complex.

An optical disc playing apparatus cannot download all the Java applications that may possibly be used into the memory when it starts playing the optical disc, nor is it allowable to find Java applications that shall run during playing an optical disc program, thereby affecting the playing effect.

Therefore, there exists a need to provide a method and apparatus for enabling an application to cooperate with the running of a program so as to solve the problem of cooperation between the running of the application and the playing of the program.

OBJECT AND SUMMARY OF THE INVENTION

The technical problem to be solved by the present invention is to provide a method and apparatus for enabling an application to cooperate with the running of a program so as to overcome the disadvantages in the prior art.

According to an embodiment of the invention, a method for enabling an application to cooperate with the running of a program is provided. Said method comprises the steps of: (a) acquiring the running control information of said application and the playing control information of said program; (b) generating, according to the acquired running control information, linking information for linking said application; and (c) editing a program playing control file by using said linking information and said playing control information so that said application cooperates with said running of the program, wherein said program playing control file is used to control the playing of said program.

According to an embodiment of the invention, an apparatus for enabling an application to cooperate with the running of a program is provided. Said apparatus comprises: an acquiring means for acquiring the running control information of said application and the playing control information of said program; a generating means for generating, according to the acquired running control information, linking information for linking said application; and an editing means for editing a program playing control file by using said linking information and said playing control information so that said application cooperates with said running of the program, wherein said program playing control file is used to control the playing of said program.

The method and apparatus provided by the invention link information through the application in the program playing control file, the application may be downloaded and run at determined time and in a determined manner to cooperate with the playing of said program, at the same time of guaranteeing the playing effect of optical disc program, good interactive operation function and network linking function are realized together with other functions that need to be supported by the application.

Through the description of the invention made with reference to the accompanying drawings and claims, other objects and achievements of the present invention will become obvious and a comprehensive understanding of the present invention can be obtained.

BRIEF DESCRIPTION OF DRAWINGS

The present invention is further explained in details through embodiments and with reference to the drawings.

In all the figures, the same reference signs represent the same, similar or corresponding features or functions.

DETAILED DESCRIPTION OF THE INVENTION

The concept of the invention is to edit the playing control information of a program and the linking information of an application corresponding to the program into a program playing control file. Through executing said playing control file, according to the guide of the linking information and based on the running control information of the application, the application can be downloaded, run or the running thereof can be stopped in cooperation with the playing of the optical disc program. The scheme of combining an application and a program into a playing control file will effectively cause the downloading and running of the application to cooperate with the playing of the program so as to ensure normal realization of corresponding functions.

Figure 1:
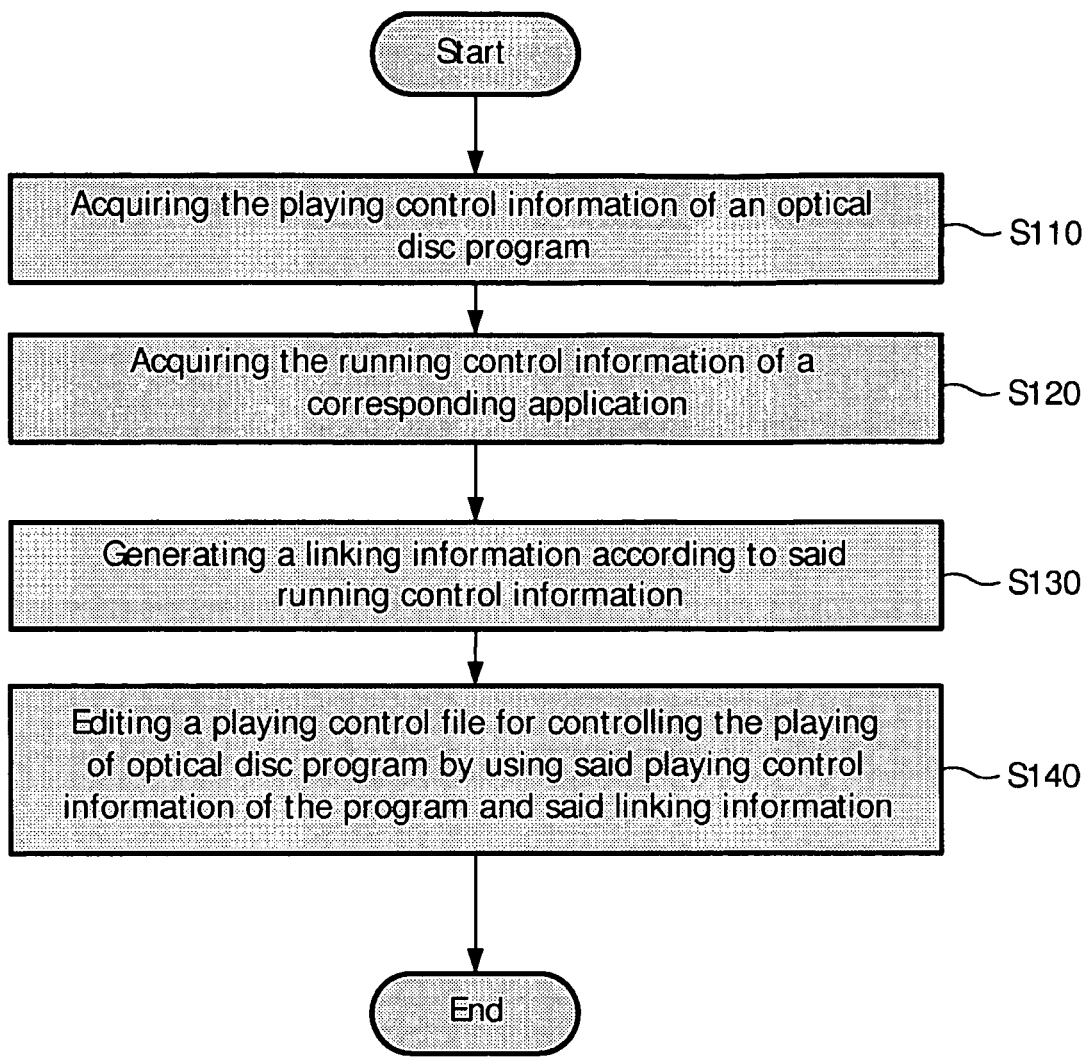
FIG. 1 is a flow chart of a method for enabling an application to cooperate with the running of a program according to an embodiment of the invention.

FIG. 1 is a flow chart of a method for enabling an application to cooperate with the running of a program according to an embodiment of the invention. Taking a Blue-ray Disc as an example, when editing an optical disc, first of all, the playing control information of a program on the optical disc is acquired (step S110). The playing control information comprises the information like a storage address of a program on the optical disc or a downloading address of the program in the network, a Title of the program and the length of the Title, a Title playback type, a Title access type, etc. All the information are some characteristics of the optical disc program per se and have already been determined before editing the optical disc.

Then, the running control information of the application corresponding to said optical disc program is acquired (step S120). The running control information comprises: the type of the application, an identification of the application, a version of the application, a priority and control type of the application, a storage address, whether to download in advance, the running start time, the running end time, etc. Some information are the descriptive information of the application per se, whereas some information are determined by editors with respect to the whole playing process or part of chapters or pictures of the optical disc program in order to realize a certain specific playing effect or provide specific functions.

Next, according to the running control information of the application, linking information is generated (Step S130) to link the application. The generated linking information of the application may, during the later playing of the optical disc, link the running control information of the application to the optical disc playing apparatus so that the optical disc playing apparatus can download or download in advance, run or stop running corresponding applications according to the running control information.

Finally, the acquired playing control information of the optical disc program and the generated linking information of the application are edited into an optical disc program playing control file (S140). The optical disc program playing control file can be a file that has already generated according to the playing control information of the optical disc program, to which the linking information of the application and/or the playing control information of a new optical disc program and so on are added, or a file that is newly generated according to the requirement of an optical disc format in this step.

During playing an optical disc, the optical disc playing apparatus will play the optical disc program according to the playing control file. An optical disc program control file combines the program to be played with the corresponding application via the linking information of the application. By means of this file, the playing of the optical disc program and the running of the corresponding application can be combined together to reach the anticipated playing effect and functions.

In a Blue-ray Disc format, the playing control information of the optical disc program may be an index table of a title of the optical disc program. In the index table, each of titles of optical disc programs is realized by using a linking sentence for linking an Application Management Table (AMT), the linking sentence can point directly to a corresponding Java application.

Through the aforesaid method, the downloading and running of an application can be combined with the playing of the optical disc program in a determined manner so as to realize the anticipated playing effect, while the situation that the calling and running of the application does not harmonize with the playing of the optical disc program will not appear.

Below, the present invention is described by taking an example of enabling a Java application to cooperate with the running of an optical disc program in a Blue-ray Disc.

According to playing mode, a Blue-ray Disc is classified into a Movie Mode that is set forth in advance and a Full Mode that is set forth later. The Movie Mode does not supply support for a Java application, it does not recognize and ignores the information about the Java application contained possibly on the optical disc. In addition to containing the contents and functions included in the Movie Mode, the Full Mode further supports a Java application, comprising the Java application corresponding to said optical disc program, and offers the functions provided by the Java application. The method provided by the present invention is implemented under the Full Mode of the Blue-ray Disc.

In a Blue-ray Disc format, optical disc programs are listed in an Index Table in a form of Title, the optical disc playing apparatus can play the optical disc programs to which the titles in the Index Table correspond according to the Index Table and perform playing according to the playing control information therein.

Table I is an Index Table of a Blue-ray Disc title, wherein the rest items in the left column, besides "Title_ref_to_javaObj_id" that is specific to the present invention, are the contents common to the Movie Mode and Full Mode of the Blue-ray Disc format. Said "Title_ref_to_javaObj_id" is the linking information of Java application that is edited in the Index Table according to the invention. If the optical disc playing apparatus can only support the Movie Mode, this sentence is ignored; if the optical disc playing apparatus can support the Movie Mode and Full Mode, this sentence is edited as a default value or is set as an alternative value. The middle column in Table I lists the specified number of bytes of various parameters, and the right column indicates the data types of various parameters.

TABLE I the portion related to title 16 in the Index Table of a Blue-ray Disc

| Contents of Titles | Date Characters | Type |
|---|---|---|
| Number_of_Titles | 16 | Uimsbf |
| for (title_number =0; title_number < number_of_Tiltes; title_number++) { | | |
| Title[title_number] ( ) { | | |
| Title_playback_type[title_number] | 1 | Uimsbf |
| Title_access_type[title_number] | 2 | Uimsbf |
| Reserved | 29 | Bslbf |
| Title_ref_to_mobj_id[title_number] | 16 | Uimsbf |
| Title_ref_to_javaObj_id | | |
| Title_name_length[title_number] | 8 | Uimsbf |
| Title_name[title_number] | 8 * 255 | bslbf |
| } | | |
| } | | |
| } | | |

Said "Title_ref_to_javaObj_id" can guide the optical playing apparatus to the management files corresponding to the title program and having a Java application with an identification mark id, and controls the downloading and running of the application according to corresponding running control information in the management file. Usually, a Java application corresponding to an optical disc program can be managed via an AMT that contains the running control information of an application corresponding to each of the titles of the optical disc programs.

Table II is a table in an AMT showing the running control information of two applications corresponding to one optical disc program title. In the case that there are a plurality of the titles of the optical disc programs, the AMT may include information tables for a plurality of applications corresponding to each of the titles respectively.

wherein AM is an acronym of Application Management, "NewAMT" is the most recently updated AMT, because said AMT can at once be a table that is stored in the network and updated at any moment and a table that is locally stored but can be updated via the network. An AMT update may be the update of the Java application therein, comprising replacement, version upgrade, variation of playing control information, etc.

Figure 2:
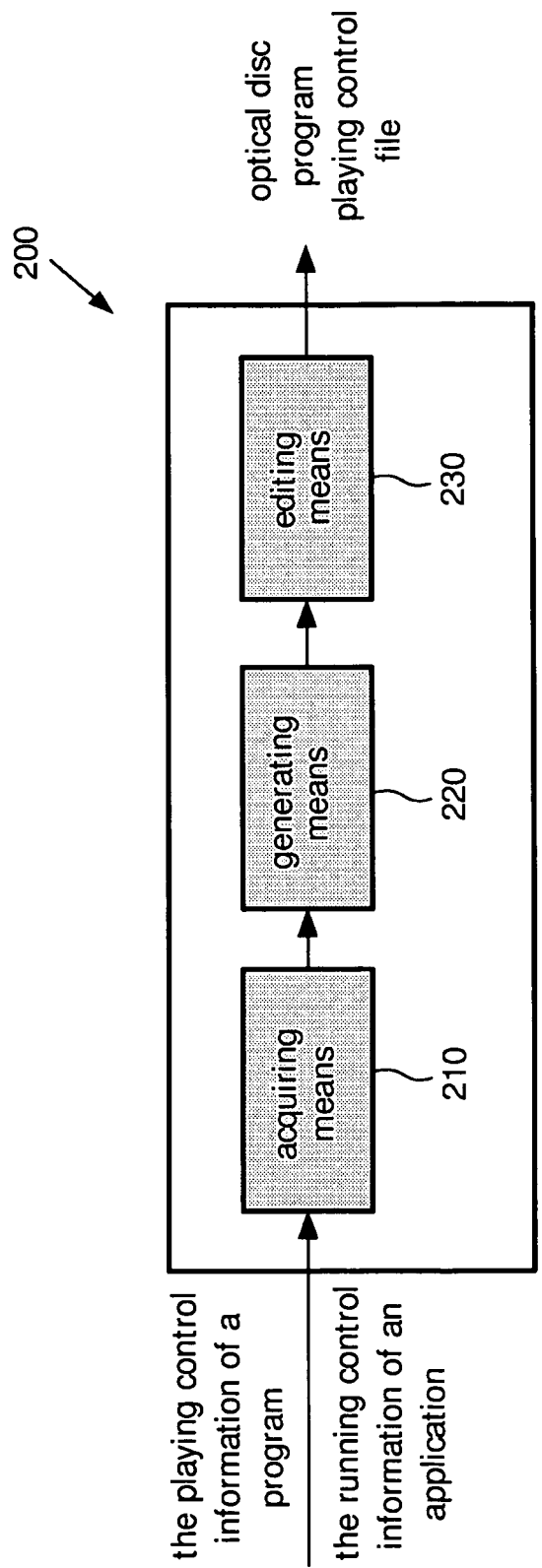
FIG. 2 is a block diagram of an apparatus for enabling an application to cooperate with the running of a program according to an embodiment of the invention.

FIG. 2 is a block diagram of an apparatus 200 for enabling an application to cooperate with the running of a program according to an embodiment of the invention. Apparatus 200 comprises an acquiring means for acquiring the playing control information of an optical disc program and the running control information of an application corresponding to the optical disc program. The playing control information of the optical disc program includes the information like the storage address of a program on the optical disc or the downloading address of the program in the network, a Title of the program and the length of the Title, a Title playback type and playing time, etc. The running control information of the application comprises the type of the application, an identification of the application, a version of the application, a priority and control type of the application, the storage address, whether to download in advance, the running start time, the running end time, etc.

Apparatus 200 further includes means for generating linking information 220. According to the running control information of an application acquired by the acquiring means 210, apparatus 220 generates linking information so that the optical disc playing apparatus can, via said linking information, control the running of the application according to corresponding running control information.

Apparatus 200 further includes an editing means 230 for editing the playing control information of the optical disc program acquired by said acquiring means 210 and the

TABLE II a schematic table in an AMT showing the running control information of
applications corresponding to one optical disc program title.

| Application identification (ID) | Application version | Application priority | Application parameter | Application running control Control type | Numerical value of control type | Application storage information | Whether to pre-load | ... |
|---|---|---|---|---|---|---|---|---|
| App_01_01 | 0.10 | 10 | | AutoStart DestroyEvent | Xxx | file://bdrom:/java_object/App_01_01.class | Yes | |
| App_01_02 | 0.10 | 5 | | StartEvent stopEvent DestroyEvent | xxx xxx xxx | file://bdrom:/java_object/App_01_02.class | No | |

Through the linking information sentence "Title_ref_to_javaObj_id" in the index table and the running control information of Java application in AMT, the optical disc playing apparatus can control smoothly the running of the application and the playing of the optical disc program, thereby realizing the playing effect and supported function. For example, if "javaObj" in the linking information sentence points to "App_01_01" included in AMT, then the optical disc playing apparatus may control playing according to the information of "App_01_01" in AMT so as to cooperate with the playing of the program.

For the linking information "Title_ref_to_javaObj_id" in the Index Table, there is a more universal represention, for example: "notifyAMOfNewAMT (AMT_Title.amt)", linking information of the application generated by the generating means 220 into an optical disc program playing control file. When playing the optical disc, the optical disc playing apparatus will play the optical disc program according to the optical disc program playing control file.

When playing the optical disc, the optical disc playing apparatus will play the optical disc program according to the playing control file. The optical disc program playing control file combines the program to be played with the corresponding application via the linking information of the application. Trough the file, the playing of the optical disc program and the running of corresponding application can be combined correspondingly so as to reach the anticipated playing effect and function.

Although the invention is described above in connection with embodiments, apparently it is obvious that those skilled in the art are able to make various alternations, modifications and changes based on the contents described above. Therefore, such alternations, modifications and changes shall come within the scope of spirit and range of the appended claims.

The invention claimed is:

1. A method for enabling at least at least two of a plurality of applications to cooperate with playing a program on an optical disk playing apparatus, the method comprising acts of:
    acquiring first information for running of the at least two of the plurality of applications and second information for playing of the program;
    generating, according to the acquired first information, third information for linking the at least two of the plurality of applications corresponding to at least a portion of the program, the third information pointing to an Application Management Table (AMT) that includes a plurality of information tables for linking the at least two of the plurality of applications corresponding to the program; and
    including the third information together with the second information in a single playing control file that controls the playing of the program and the running of the at least two of the plurality of applications in cooperation with the playing of the program.

2. The method according to claim 1, comprising an act of storing the program as an optical disc program on an optical disc together with the single playing control file.

3. The method according to claim 2, wherein the act of storing the optical disc program comprises an act of storing the optical disc program in a Blue-ray Disc format.

4. The method according to claim 3, wherein at least one application of the plurality of applications is a Java application.

5. The method according to claim 1, wherein the second information includes at least one of the following: title of the optical disc program, storage address of the optical disc program and playing time.

6. The method according to claim 1, wherein the first information includes at least one of the following: type of at least one application of the plurality of applications, identification of at least one application of the plurality of applications, storage address, running start time and running end time.

7. The method according to claim 1, wherein the act of generating the third information comprises an act of generating the linking to enable one of downloading or downloading in advance of at least one application of the plurality of applications and one of running or stop running at least one application of the plurality of applications.

8. The method according to claim 1, wherein the act of including the third information together with the second information in the single playing control file comprises an act of modifying the single playing control file to include the third information.

9. The method according to claim 1, wherein the act of including the third information together with the second information in the single playing control file comprises an act of generating a new file as the single playing control file.

10. An apparatus for enabling at least at least two of a plurality of applications to cooperate with playing of a program, the apparatus comprising:
    a first processor portion configured to acquire first information for running of the at least two of the plurality of applications and second information for playing of the program;
    a second processor portion configured to generate, according to the acquired first information, third information linking the at least two of the plurality of applications corresponding to at least a portion of the program, the third information pointing to an Application Management Table (AMT) that includes a plurality of information tables for linking the at least two of the plurality of applications corresponding to the program; and
    a third processor portion configured to include the third information together with the second information in a single playing control file that controls the playing of the program and the running of the at least two of the plurality of applications in cooperation with the playing of the program.

11. The apparatus according to claim 10, wherein the program includes an optical disc program stored on the optical disc together with the single playing control file.

12. The apparatus according to claim 11, wherein the optical disc program is stored in a Blue-ray Disc format.

13. The apparatus according to claim 12, wherein at least one application of the plurality of applications is a Java application.

14. The apparatus according to claim 10, wherein the second information includes at least one of the following: title of the optical disc program, storage address of the optical disc program, or playing time.

15. The apparatus according to claim 10, wherein the first information includes at least one of the following: a type of at least one application of the plurality of applications, identification of at least one application of the plurality of applications, storage address, running start time and running end time.

16. The apparatus according to claim 10, wherein the second processor portion is configured to generate the third information to enable one of downloading or downloading in advance at least one application of the plurality of applications and one of running or stop running at least one application of the plurality of applications.

17. The apparatus according to claim 10, wherein the third processor portion is configured to include the third information together with the second information in the single playing control file by modifying the single playing control file to include the third information.

18. The apparatus according to claim 10, wherein the third processor portion is configured to modify the playing control file by generating a new file as the single playing control file.

* * * * *